(No Model.)

R. MARQUART.
INSERTIBLE SAW TOOTH.

No. 525,852. Patented Sept. 11, 1894.

Witnesses:
J. Staib
Chas. H. Smith

Inventor:
Rudolf Marquart
per Lemuel W. Serrell
Atty

UNITED STATES PATENT OFFICE.

RUDOLF MARQUART, OF NEW YORK, N. Y., ASSIGNOR TO HIMSELF AND CHARLES BRANDT, JR., OF SAME PLACE, AND EDWARD B. TOMPKINS, OF BROOKLYN, NEW YORK.

INSERTIBLE SAW-TOOTH.

SPECIFICATION forming part of Letters Patent No. 525,852, dated September 11, 1894.

Application filed May 14, 1894. Serial No. 511,071. (No model.)

*To all whom it may concern:*

Be it known that I, RUDOLF MARQUART, a subject of the Emperor of Germany, and a resident of the city, county, and State of New York, have invented a new and useful Improvement in Insertible Saw-Teeth, of which the following is a specification.

My present invention relates to improvements in insertible diamond pointed teeth for saws, especially such saws as are employed for cutting stone, and the object of my invention is to hold the teeth securely to the saw blade.

My invention consists in providing recesses in the meeting faces of the saw blade or insertible tooth into which after the insertion of the tooth the adjacent and overlapping metal can be forced to securely hold the parts together. There are V-shaped edge grooves in one part and beveled edges in the other part to fit the V-shaped grooves.

Figure 1:
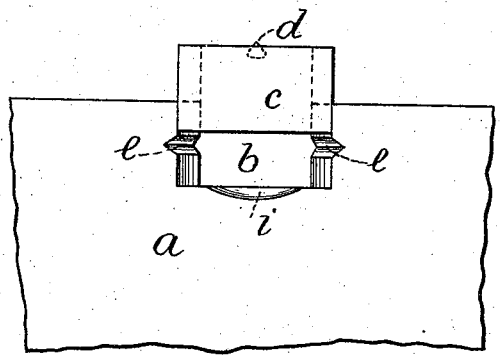
Figure 4:
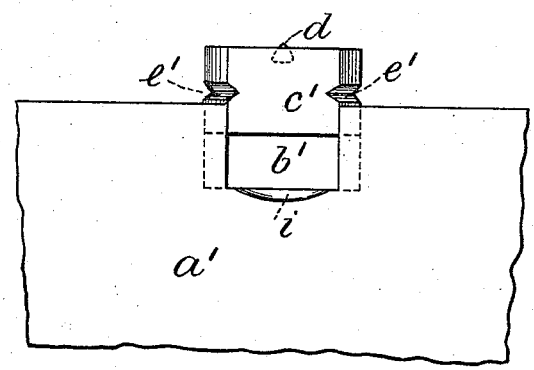
Figure 2:
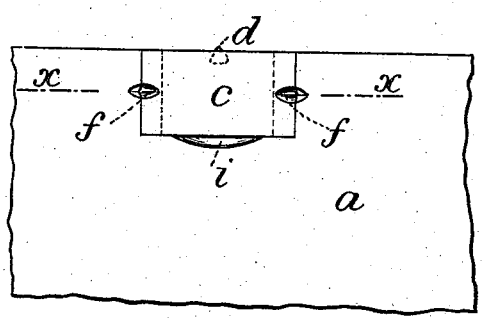
Figure 5:
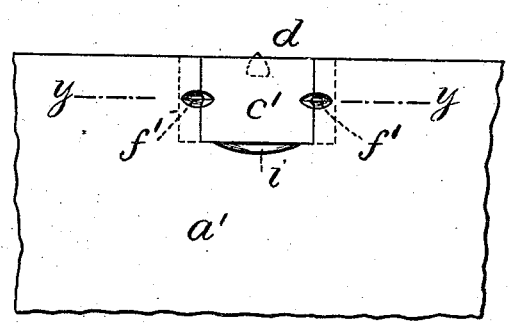

In the drawings, Figures 1 and 4 are side elevations of part of a saw blade and of the insertible teeth partially inserted. Figs. 2 and 5 are similar side elevations with the teeth fully inserted and secured, and Figs. 3 and 6 are cross sections at the lines $x$ $x$ and $y$ $y$ of Figs. 2 and 5 respectively.

Figure 3:
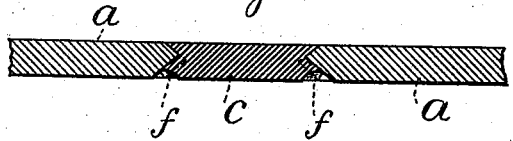

In Figs. 1, 2, and 3, $a$ represents part of the saw blade provided with the usual rectangular edge recesses $b$ for the insertible saw teeth $c$ and in which saw teeth the diamond $d$ or diamonds are secured.

The end edges of the teeth $c$ are provided with V-shaped grooves and the sides of the rectangular recesses of the blade $a$ are double inclined or beveled to correspond therewith. The grooves $e$ are made across and in one of the faces of the beveled sides of the recess $b$, and when the tooth is inserted and pushed down to place one face of the tooth comes over and covers most of said grooves. When each tooth is fully inserted a set punch is employed to force the metal of the tooth $c$ at the grooves $e$ down into the said grooves and which action forms the recesses $f$. Thus the inner portions of the edges of the teeth are pressed into the grooves $e$ and the teeth are held firmly in place.

Figure 6:
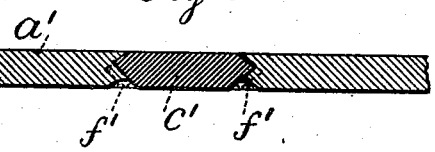

In Figs. 4, 5, and 6, the saw blade $a'$ is provided with the usual rectangular recesses $b'$ for the insertible saw teeth $c'$ in which saw teeth the diamond $d$ is secured. In these views the sides of the rectangular recesses $b'$ are provided with V-shaped grooves and the end edges of the teeth $c'$ are double inclined or beveled to correspond therewith.

The grooves $e'$ are made across and in one of the faces of the beveled end edges of the teeth $c'$, and when the tooth is pushed down to place one face of the saw blade comes over and covers most of said grooves, and as heretofore described a set punch is employed to force the metal of the saw blade down into the grooves and which action forms the recesses $f'$, and thus the inner portions of the edges of the saw blade are pressed into the grooves $e'$ and the teeth are held firmly in place.

The manner of holding the teeth to the saw blade in Figs. 4, 5, and 6 is identical with that shown in Figs. 1, 2, and 3, the only difference being that the V grooves and beveled edges are reversed, the notches $e$ $e'$ in both cases being in and across the beveled edges.

I prefer to notch the edge of the saw blade at $i$ so as to expose the edge or base of the teeth and present a footing for the action of a tool when it becomes necessary to remove a tooth and insert another.

I claim as my invention—

The combination with a saw blade having recesses in its edges, of teeth adapted to fit said recesses, the end edges of the teeth and the adjacent sides of the recesses having V-shaped edge grooves and corresponding beveled edges to fit therewith, and with grooves across and in one of the faces of the beveled edges into which the metal of the adjacent part is forced to hold the tooth to the saw blade, substantially as set forth.

Signed by me this 8th day of May, A. D. 1894.

RUDOLF MARQUART.

Witnesses:
GEO. T. PINCKNEY,
HAROLD SERRELL.